(12) United States Patent
Abbas et al.

(10) Patent No.: US 10,287,115 B2
(45) Date of Patent: May 14, 2019

(54) ICE DISPENSER WITH REDUCED ICE BRIDGING THEREIN

(71) Applicant: The Coca-Cola Company, Atlanta, GA (US)

(72) Inventors: Adnan Abbas, Roswell, GA (US); Arthur G. Rudick, Atlanta, GA (US); Daniel S. Quartarone, Stone Mountain, GA (US); David Joseph Harvey, Suwanee, GA (US)

(73) Assignee: The Coca-Cola Company, Atlanta, GA (US)

( * ) Notice: Subject to any disclaimer, the term of this patent is extended or adjusted under 35 U.S.C. 154(b) by 138 days.

(21) Appl. No.: 15/071,390

(22) Filed: Mar. 16, 2016

(65) Prior Publication Data

US 2017/0268813 A1   Sep. 21, 2017

(51) Int. Cl.
F25C 5/20 (2018.01)
B65G 65/40 (2006.01)
F25C 5/182 (2018.01)

(52) U.S. Cl.
CPC .............. B65G 65/40 (2013.01); F25C 5/24 (2018.01); F25C 5/182 (2013.01); F25C 2400/04 (2013.01)

(58) Field of Classification Search
CPC .......... F25C 5/002; F25C 5/005; F25C 5/007; F25C 5/16; F25C 5/182; F25C 2300/00; F25C 2400/04; F25C 2400/10; F25C 2500/02; F25C 2500/08; F25C 5/02; F25C 5/08; F25C 5/18; F25C 5/20; F25C 5/22; F25C 5/24; F25C 2400/08; B65G 65/40; B65G 3/04; B65G 11/126; B65G 11/206; B65G 2812/08; B65G 2812/081; B65G 2814/0323; B65G 11/083; B65G 11/085; B65G 2201/04; B65G 2201/042; E04F 17/02
USPC ................. 62/389–400, 344, 464; 193/1–34; 141/331–345; 222/146.1–146.2, 222/146.5–146.6, 386–386.5, 410–412, 222/459–462, 216–248, 196–203, 505
See application file for complete search history.

(56) References Cited

U.S. PATENT DOCUMENTS

| | | | | | |
|---|---|---|---|---|---|
| 2,720,341 | A | * | 10/1955 | Stirn | G01F 11/24 193/25 R |
| D218,487 | S | * | 8/1970 | Flores | 141/331 |
| 3,887,119 | A | * | 6/1975 | Sucro | F25C 5/00 222/247 |
| 3,921,351 | A | * | 11/1975 | Johnson | B65D 88/28 222/462 |
| 4,055,053 | A | * | 10/1977 | Elfving | F25B 21/02 62/3.63 |
| 4,886,097 | A | * | 12/1989 | Garza-Ondarza | B65D 88/28 141/333 |
| 5,339,872 | A | * | 8/1994 | Marino | B65F 1/0006 137/312 |

(Continued)

Primary Examiner — Paul R Durand
Assistant Examiner — Andrew P Bainbridge
(74) Attorney, Agent, or Firm — Eversheds Sutherland (US) LLP

(57) ABSTRACT

The present application provides an ice dispenser for dispensing a volume of ice. The ice dispenser may include an ice bin and an ice deflector positioned about a top of the ice bin. The ice deflector may include a reverse funnel configuration such that an entrance to the ice deflector is narrower that an exit to the ice deflector so as to prevent the volume of ice from bridging therein in whole or in part.

20 Claims, 9 Drawing Sheets

(56) References Cited

U.S. PATENT DOCUMENTS

| | | | | |
|---|---|---|---|---|
| 5,560,221 A * | 10/1996 | Snelling | B67D 1/0857 62/344 |
| 5,848,625 A * | 12/1998 | Ebert | B65B 1/06 141/246 |
| 5,910,164 A * | 6/1999 | Snelling | F25C 5/24 62/344 |
| 6,158,564 A * | 12/2000 | Derelanko | F25C 5/005 193/2 R |
| 6,250,514 B1 * | 6/2001 | Hansson | B65D 88/28 193/2 R |
| 6,425,258 B1 * | 7/2002 | Barnett | F25C 5/04 62/344 |
| 6,561,691 B1 * | 5/2003 | McCann | F25C 5/24 366/299 |
| 6,964,351 B2 * | 11/2005 | Jablonski | F25C 5/007 141/362 |
| 7,784,292 B2 * | 8/2010 | Lee | F25C 5/187 62/137 |
| 7,963,120 B2 * | 6/2011 | An | F25C 5/046 62/344 |
| 8,844,314 B2 * | 9/2014 | Bortoletto | F25C 1/08 62/347 |
| 8,869,550 B2 * | 10/2014 | Krause | F25B 21/04 222/146.6 |
| 2006/0027599 A1 * | 2/2006 | Edwards | F25C 5/24 222/129.1 |
| 2006/0196213 A1 * | 9/2006 | Anderson | F25C 5/22 62/344 |
| 2008/0092567 A1 * | 4/2008 | Doberstein | F25C 1/12 62/137 |
| 2010/0313595 A1 * | 12/2010 | Seo | F25C 5/005 62/344 |
| 2011/0185759 A1 * | 8/2011 | Kang | F25C 1/225 62/340 |
| 2012/0247066 A1 * | 10/2012 | Dunn | F25C 5/002 53/428 |
| 2014/0013792 A1 * | 1/2014 | Lee | F25C 1/00 62/344 |
| 2014/0123687 A1 * | 5/2014 | Visin | F25C 5/04 62/71 |
| 2015/0008244 A1 * | 1/2015 | Chang | F25C 5/002 222/505 |
| 2015/0276293 A1 * | 10/2015 | Seo | F25C 5/005 222/1 |
| 2016/0059192 A1 * | 3/2016 | Jeong | B01F 3/04808 99/323.2 |

* cited by examiner

ICE DISPENSER WITH REDUCED ICE BRIDGING THEREIN

TECHNICAL FIELD

The present application and the resultant patent relate generally to ice dispensers and more particularly relate to an ice dispenser with an internal ice deflector for reduced ice bridging therein.

BACKGROUND OF THE INVENTION

Generally described, known ice dispensers may include an internal agitator within an ice bin to keep the ice therein in a free flowing state so as to prevent clogging and the like. Pellet ice or soft ice, however, tends to form a "bridge" of ice, or a semi-solid mass of ice, about the top of the ice bin and out of reach of the agitation device. The ice bridge may define an internal void so as to prevent the ice dispenser from both dispensing ice and receiving new ice within the ice bin.

SUMMARY OF THE INVENTION

The present application and the resultant patent thus provide an ice dispenser for dispensing a volume of ice. The ice dispenser may include an ice bin and an ice deflector positioned about a top of the ice bin. The ice deflector may include a reverse funnel configuration such that an entrance to the ice deflector is narrower that an exit to the ice deflector so as to prevent the volume of ice from bridging therein in whole or in part.

The present application and the resultant patent further may provide an ice dispenser. The ice dispenser may include an ice bin, a volume of soft, pellet ice within the ice bin, and an ice deflector positioned about a top of the ice bin. The ice deflector may include a pair of deflector side plates positioned in a reverse funnel configuration such that an entrance to the ice deflector is narrower that an exit to the ice deflector so as to prevent the volume of soft, pellet ice from bridging therein in whole or in part.

The present application and the resultant patent further may provide an ice dispenser for dispensing a volume of ice. The ice dispenser may include an ice bin, an agitator within the ice bin, and an electro-mechanical ice deflector positioned about a top of the ice bin above the agitator.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
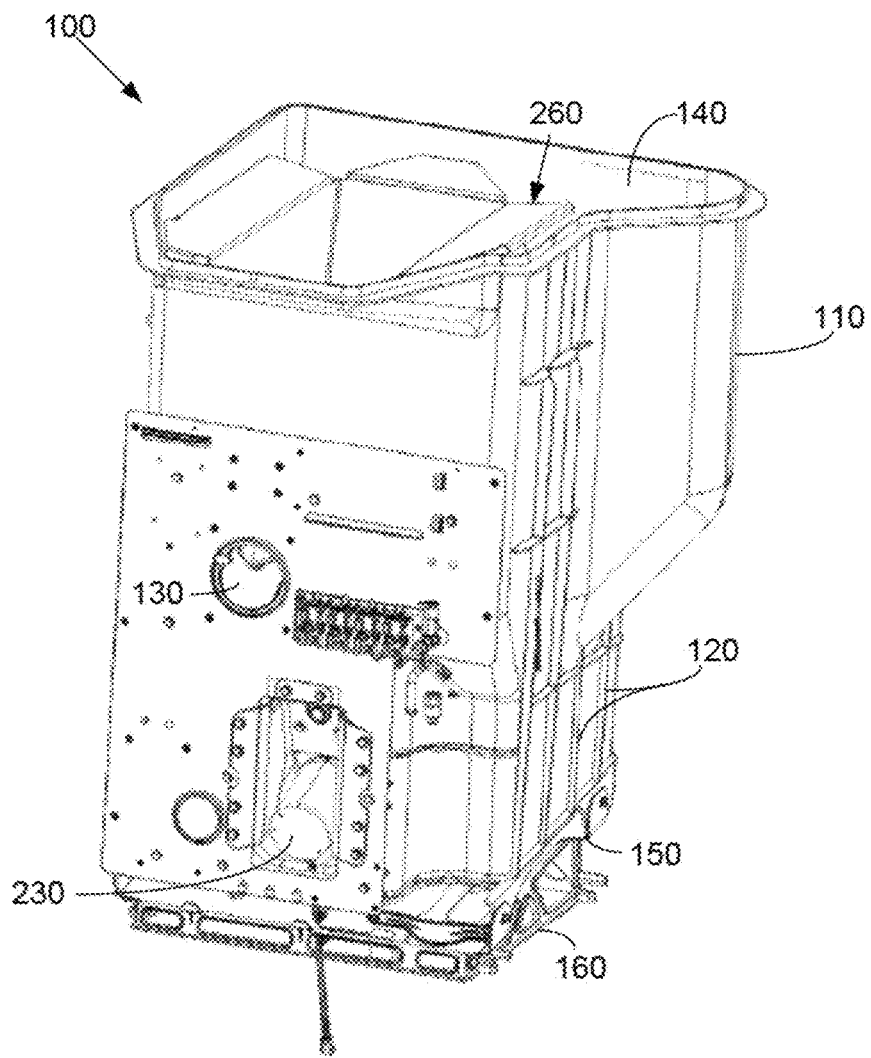
FIG. 1 is a partial perspective view of an ice dispenser as may be described herein.
Figure 2:
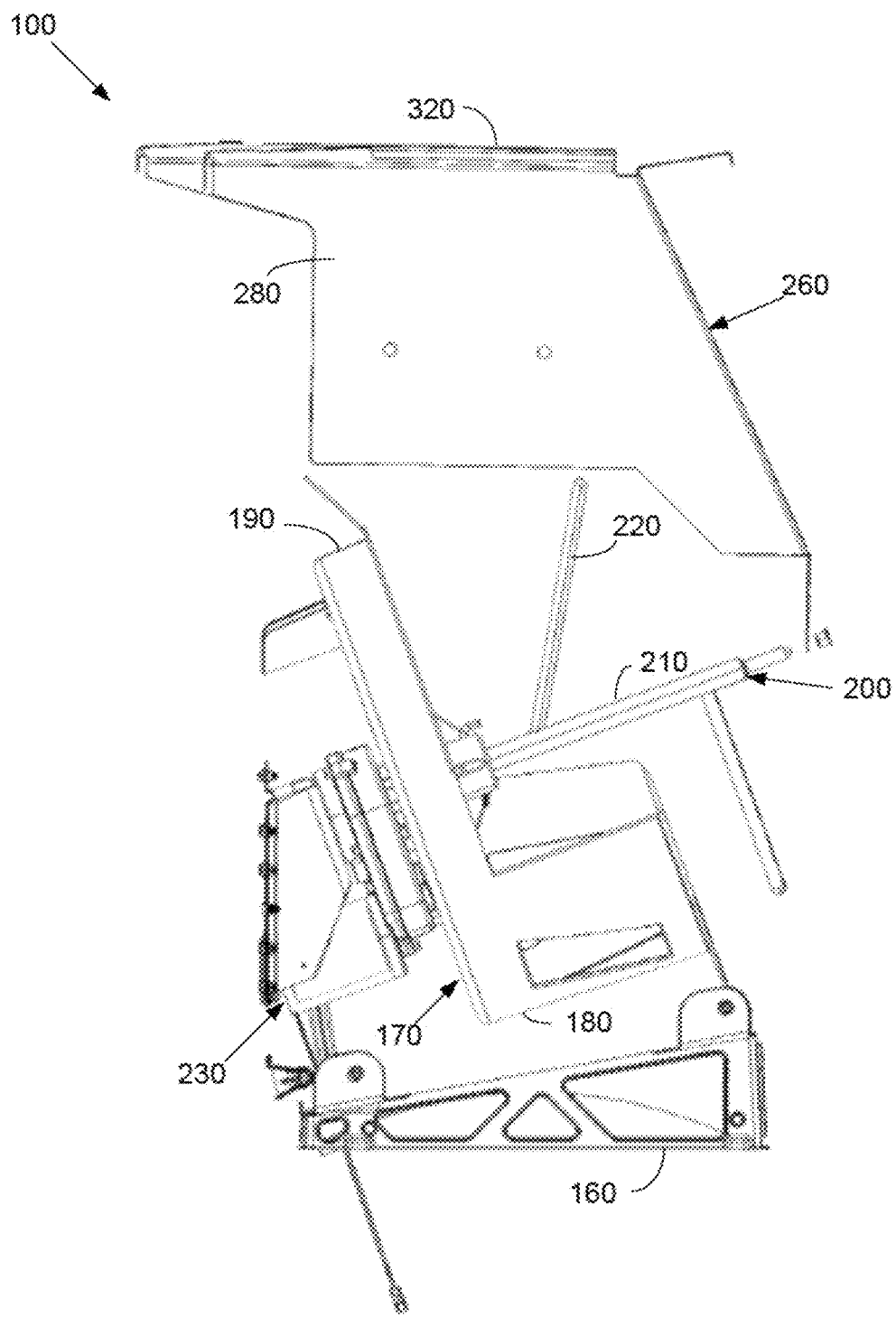
FIG. 2 is a side plan view of the internal components of the ice dispenser of FIG. 1
Figure 3:
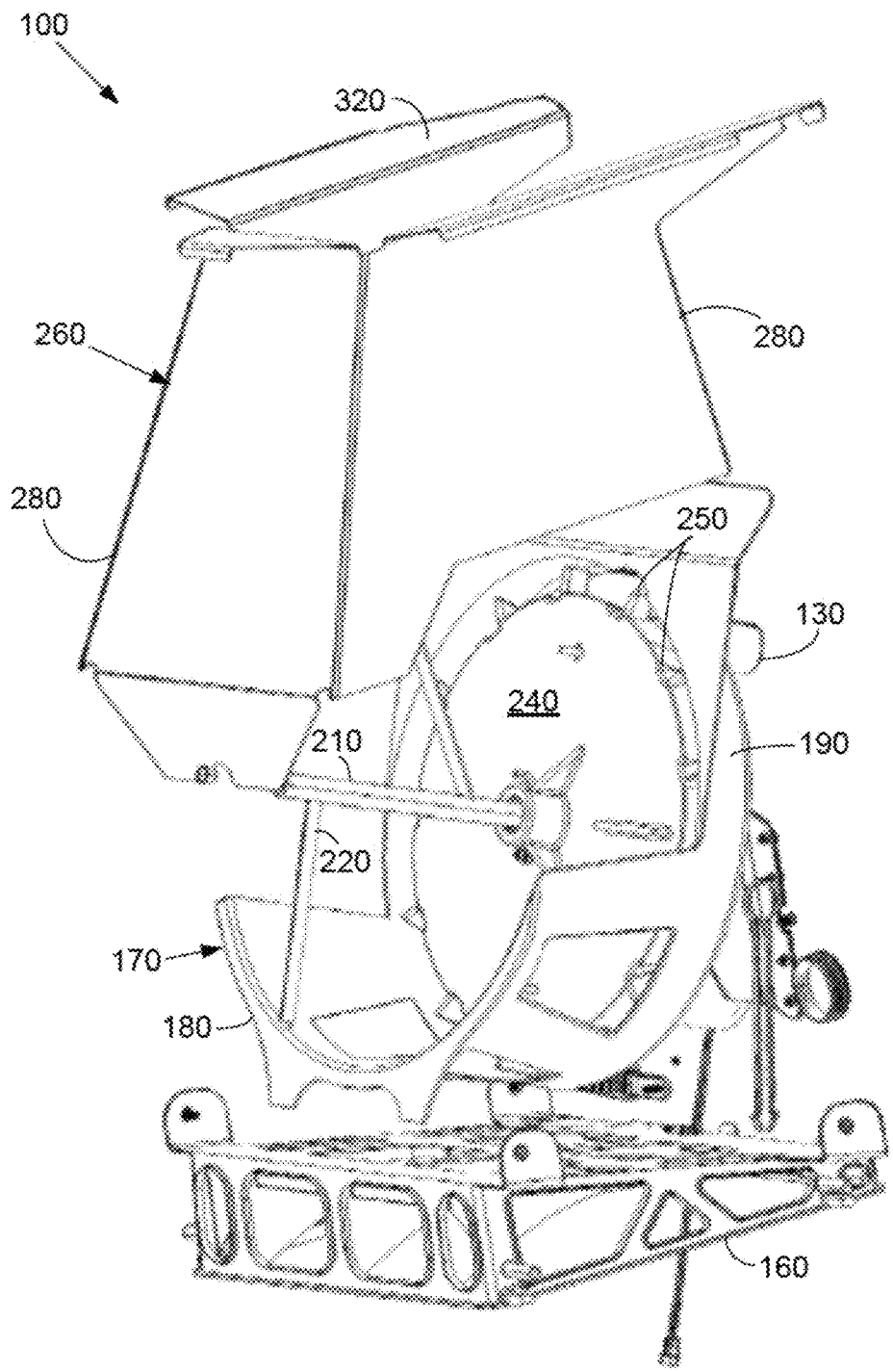
FIG. 3 is a perspective view of the internal components of the ice dispenser of FIG. 1.
Figure 4:
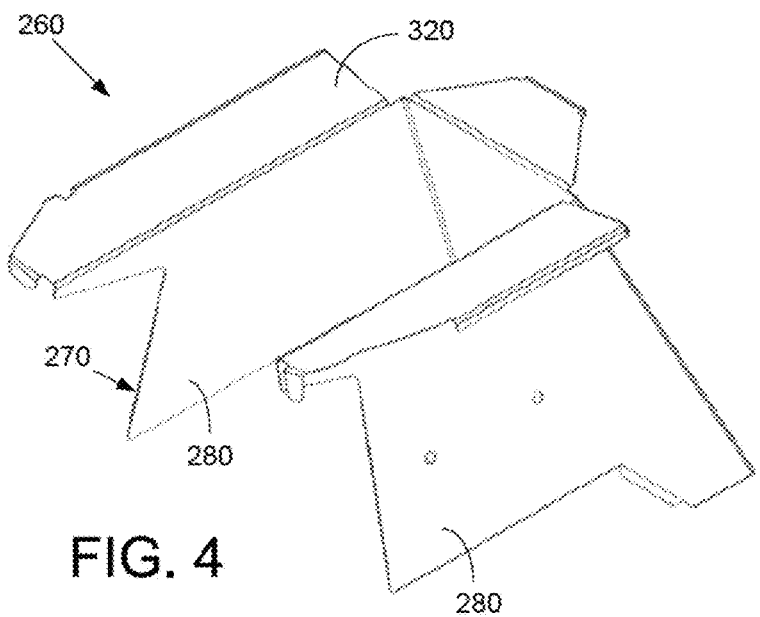
FIG. 4 is a perspective view of an ice defector for use with the ice dispenser of FIG. 1.
Figure 5:
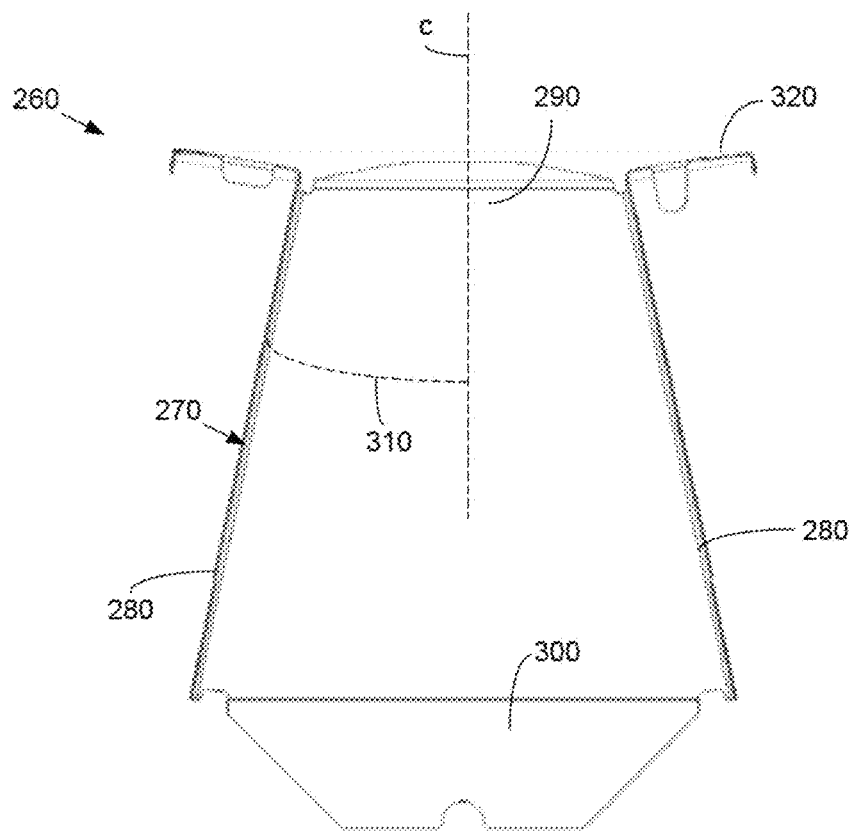
FIG. 5 is a side plan view of the ice deflector of FIG. 4.
Figure 6:
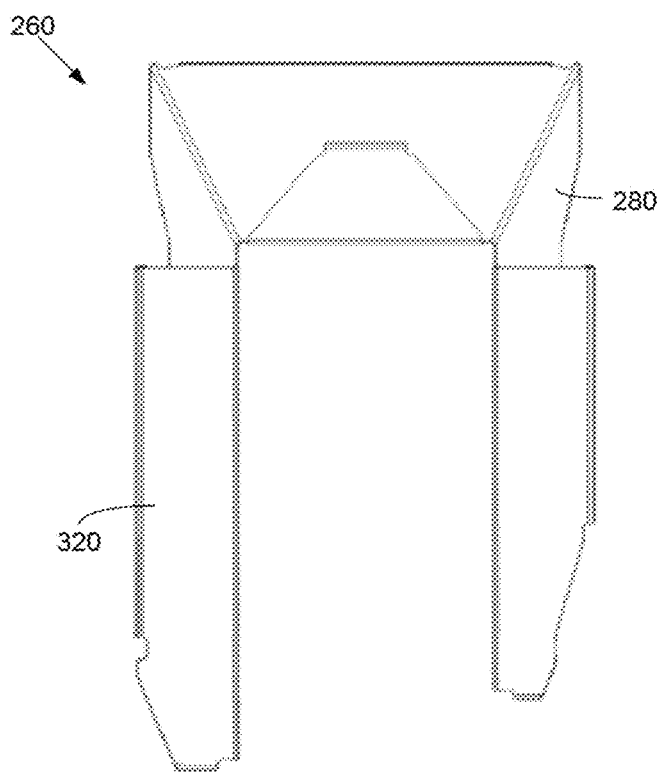
FIG. 6 is a top plan view of the ice deflector of FIG. 4.

Referring now to the drawings, in which like numerals refer to like elements throughout the several views, FIGS. 1-3 show an example of an ice dispenser 100 as may be described herein. The ice dispenser 100 may be used to dispense a volume of ice therefrom. Specifically, the ice dispenser 100 may be used to dispense pellet ice or "soft" ice therefrom although any type of ice may be used herein. "Soft" ice may have a water content of more than about five percent (5%) or ten percent (10%) by volume or so. Moreover, such soft ice may be batch harvested in a continuous extrusion process. Other types of processes may be used.

The ice dispenser 100 may include an internal ice bin 110. The ice bin 110 may have any suitable size, shape, or configuration. The ice bin 110 may be made from a food grade material such as a food grade thermoplastic and the like. Specifically, the ice bin 110 may be made in an injection molded process. The ice bin 110 may have a number of external ribs 120 thereon. The ribs 120 may allow the thermoplastic material to flow during the molding process for consistent thickness and material coverage. The ice bin 110 may have an ice chute 130. The ice chute 130 may be integrally formed therein. The use of the integrated ice chute 130 thus may avoid leakage at the joints thereof. The ice chute 130 may have a circular shape, and oval shape, or any suitable size, shape, or configuration. The ice chute 130 may narrow along its length. A number of ribs may be formed with the ice chute 130 as well. Other components and other configurations may be used herein.

The ice bin 110 may have an open top 140 and a bottom portion 150. The bottom portion 150 of the ice bin 110 may be positioned about a dispenser base 160 in communication with a conventional cold plate and the like. In this example, the dispenser base 160 may have a substantial wedge-like shape. The dispenser base 160 may have any suitable size, shape, or configuration.

FIGS. 2 and 3 show the internal components of the ice dispenser 100. The ice bin 110 may include an internal ice shroud 170. The ice shroud 170 may include a bottom support 180 and a side face 190. The bottom support 180 may be largely semi-circular in shape and may serve to support the ice therein. The side face 190 may serve as a support for the agitation components and the dispensing components as will be described in more detail below. Other components and other configurations also may be used herein.

The ice dispenser 100 may include an agitation system 200. The agitation system 200 may include a drive rod 210. The drive rod 210 may support a number of agitator arms 220. Any number of the agitator arms 220 may be used herein in any suitable size, shape, or configuration. The agitation system 200 also may include a drive motor 230. The drive motor 230 may be a conventional electrical motor and the like. The drive motor 230 may be mounted about the side face 190 of the ice shroud 170 or otherwise and extend outside the ice bin 110. The drive motor 230 rotates the drive rod 210. Other types of agitation devices and drives may be used herein. Other components and other configurations may be used herein.

The ice dispenser 100 also may include an internal ice dispense wheel 240. The ice dispense wheel 240 may have a number of dispense fins 250 mounted thereon. The ice dispense wheel 240 and the dispense fins 250 may have any suitable size, shape, or configuration. The ice dispense wheel 240 may be positioned about the side face 190 of the ice shroud 170 and rotate therein. The dispense fins 250 help direct the ice towards the ice chute 130 and out thereof. The ice dispense wheel 240 may be driven by the drive motor 230 or otherwise. Other types of dispensing devices may be used herein. Other components and other configurations may be used herein.

The ice dispenser 100 may include an ice deflector 260. The ice deflector 260 may be positioned about the open top 140 of the ice bin 110 just above the agitator arms 220. The ice deflector 260 may have a substantial "reverse funnel" configuration 270. Specifically, the ice deflector 260 may have a pair of deflector side plates 280. The deflector side plates 280 may be angled such that an entrance 290 into the ice deflector 260 is narrower than an exit 300 therefrom. The deflector side plates 280 may expand from a centerline C at a deflector angle 310 of about five degrees (5°) to about twenty degrees (20°) with about a twelve degree (12°) angle preferred. Other angles may be used herein. The use of the reverse funnel configuration 250 with the angled deflector side plates 280 thus prevents the ice from bridging or "keystoning" therein. The ice deflector 260 may be made out of stainless steel or other types of substantially rigid, food grade materials. The materials may be pickled and/or passivated. Other component and other configurations may be used herein.

The ice deflector 260 further may include a number of top support plates 320. The top support plates 320 may support and position the ice deflector 260 within the ice bin 110 at the open top 140 thereof. The top support plates 320 also may be angled towards the entrance 290 of the ice deflector 260 so as to promote ice flowing therethrough and into the entrance 290. The ice support plates 320 may have any suitable size, shape, or configuration. The spacing between the top support plates 320 may correspond to the working envelope of the agitator arms 220 or so. Other components and other configurations may be used herein.

The ice dispenser 100 thus assists in providing a steady stream of ice, particularly pellet or soft ice, with reduced bridging and/or clogging therein. The use of the ice deflector 260 in the reverse funnel configuration 270 thus prevents the ice from such solidifying and bridging in whole or in part. The ice defector 260 may be original equipment or part of a retrofit. Other components and other configurations may be used herein.

Figure 7:
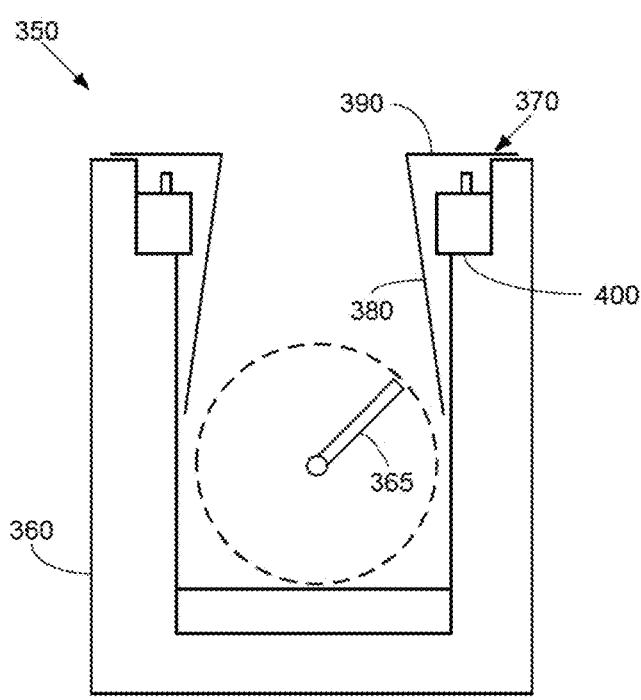
FIG. 7 is a schematic diagram of an alternative embodiment of an ice dispenser as may be described herein.

FIG. 7 shows an alternative embodiment of an ice dispenser 350 as may be described herein. The ice dispenser 350 may include an ice bin 360. The ice bin 360 may be of conventional design. The ice bin 360 may include a conventional agitator 365 therein. The ice dispenser 350 also may include an electro-mechanical deflector device in the form of a mechanical ice deflecting device 370. The ice deflecting device 370 may have one or more ice deflecting arms 380. The ice deflecting arms 380 may extend within the top of the ice bin 360 about the walls thereof. The ice deflecting arms 380 may include an upper flange 390. The deflecting arms 380 may extend into the ice bin 360 at a slight inward angle. The ice deflecting arms 380 may have any suitable size, shape, or configuration. The ice deflecting device 370 also may include one or more solenoids 400 positioned about the deflecting arms 380. Other types of drive devices may be used herein.

In use, the solenoids 400 may raise and lower the ice deflecting arms 380 so as to prevent ice from bridging on the ice deflecting arms 380 and on the walls of the ice bin 360. Once deactivated, the ice deflecting arms 380 may return to the original position via gravity, springs, and the like. The ice deflecting device 370 may operate periodically, as needed, or otherwise. Other components and other configurations also may be used herein.

Figure 8:
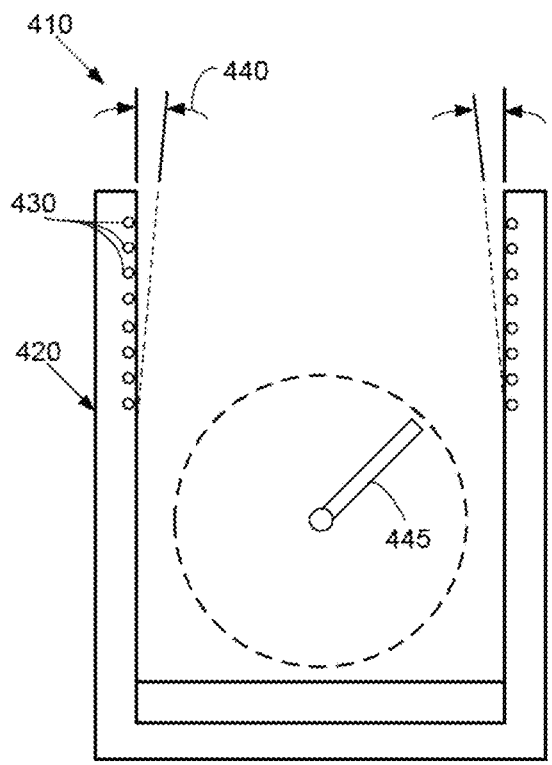
FIG. 8 is a schematic diagram of an alternative embodiment of an ice dispenser as may be described herein.

FIG. 8 shows a further embodiment of an ice dispenser 410 as may be described herein. The ice dispenser 410 may include an electro-mechanical deflector device in the form of a heated ice bin 420. The heated ice bin 420 may include a resistance heater wire 430 and the like positioned about the top thereof. Activating the resistance wire 430 prevents ice from clinging to the walls of the heated ice bin 420. Other types of heating devices may be used herein. The walls of the heated ice bin 420 may have a slight negative draft 440. The negative draft 440 also may assist in avoiding the ice from clinging thereto. The heated ice bin 420 may operate periodically, as needed, or otherwise. The heated ice bin 420 may include a conventional agitator 445 therein. Other components and other configurations also may be used herein.

Figure 9:
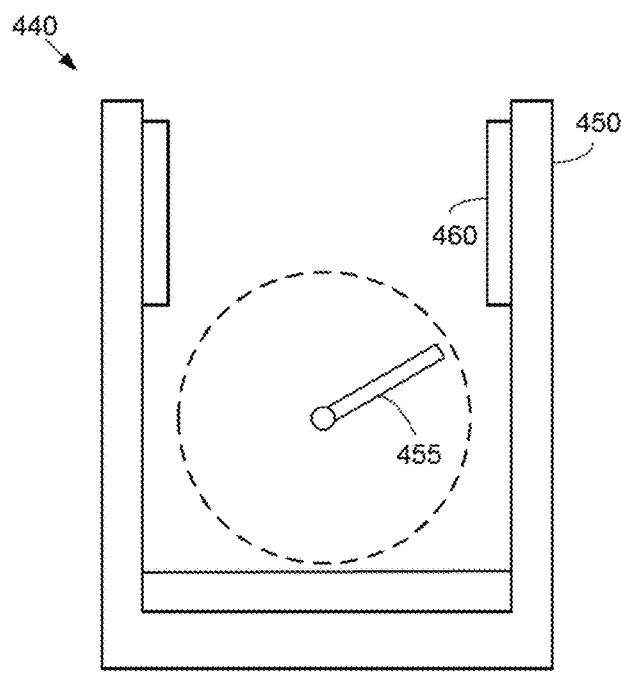
FIG. 9 is a schematic diagram of an alternative embodiment of an ice dispenser as may be described herein.

FIG. 9 shows a further embodiment of an ice dispenser 440 as may be described herein. The ice dispenser 440 may include an ice bin 450. The ice bin 450 may be of conventional design. The ice bin 450 may include a conventional agitator 455 therein. The ice dispenser 440 also may include an electro-mechanical deflector device in the form of a pneumatic bladder 460 positioned about the top of the ice bin 450. The pneumatic bladder 460 may inflate on occasion so as to prevent ice from clinging thereto. The pneumatic bladder 460 may operate periodically, as needed, or otherwise. Other components and other configurations may be used herein.

Figure 10:
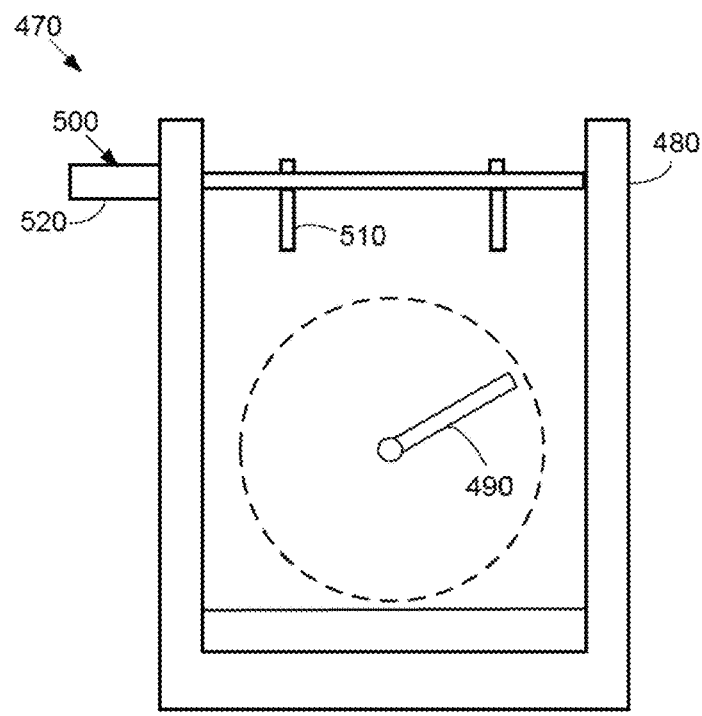
FIG. 10 is a schematic diagram of an alternative embodiment of an ice dispenser as may be described herein.

FIG. 10 shows an alternative embodiment of an ice dispenser 470 as may be described herein. The ice dispenser 470 may include an ice bin 480. The ice bin 480 may be of conventional design. The ice bin 480 may include a conventional agitator 490 therein. The ice dispenser 470 also may include an electro-mechanical deflector device in the form of a mechanical ice deflecting device 500. The ice deflecting device 500 may have one or more sliding ice deflecting arms 510. The sliding ice deflecting arms 510 may extend across the top of the ice bin 480. The sliding ice deflecting arms 510 may have any suitable size, shape, or configuration. The ice deflecting device 500 also may include one or more solenoids 520 positioned about the sliding ice deflecting arms 510. Other types of drive devices may be used herein. The solenoids 520 may horizontally slide the sliding ice deflecting arms 510 during a dispense so as to prevent ice from bridging on the sliding ice deflecting arms 510 and on the walls of the ice bin 480. The ice deflecting device 500 may operate periodically, as needed, or otherwise. Other components and other configurations also may be used herein.

Figure 11:
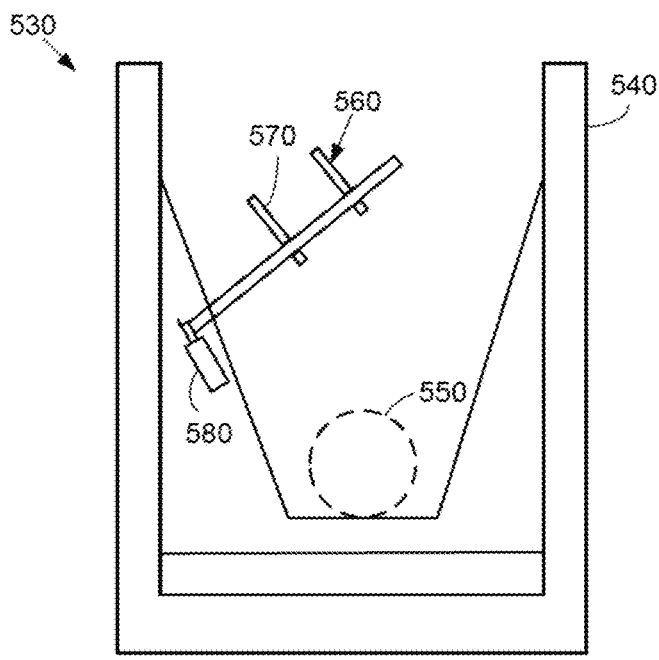
FIG. 11 is a schematic diagram of an alternative embodiment of an ice dispenser as may be described herein.

FIG. 11 shows an alternative embodiment of an ice dispenser 530 as may be described herein. The ice dispenser 530 may include an ice bin 540. The ice bin 540 may be of conventional design. The ice bin 540 may include a conventional screw drive 550 therein. The ice dispenser 530 also may include an electro-mechanical deflector device in the form of a mechanical ice deflecting device 560. The ice deflecting device 560 may have one or more pivoting ice deflecting arms 570. The pivoting ice deflecting arms 570 may extend across the top of the ice bin 540. The pivoting ice deflecting arms 570 may have any suitable size, shape, or configuration. The ice deflecting device 560 also may include one or more solenoids 580 positioned about the pivoting ice deflecting arms 570. Other types of drive devices may be used herein. The solenoids 580 may pivotably rotate the pivoting ice deflecting arms 570 so as to prevent ice from bridging on the pivoting ice deflecting arms 570 and on the walls of the ice bin 540. The ice deflecting device 560 may operate periodically, as needed, or otherwise. Other components and other configurations also may be used herein.

Figure 12:
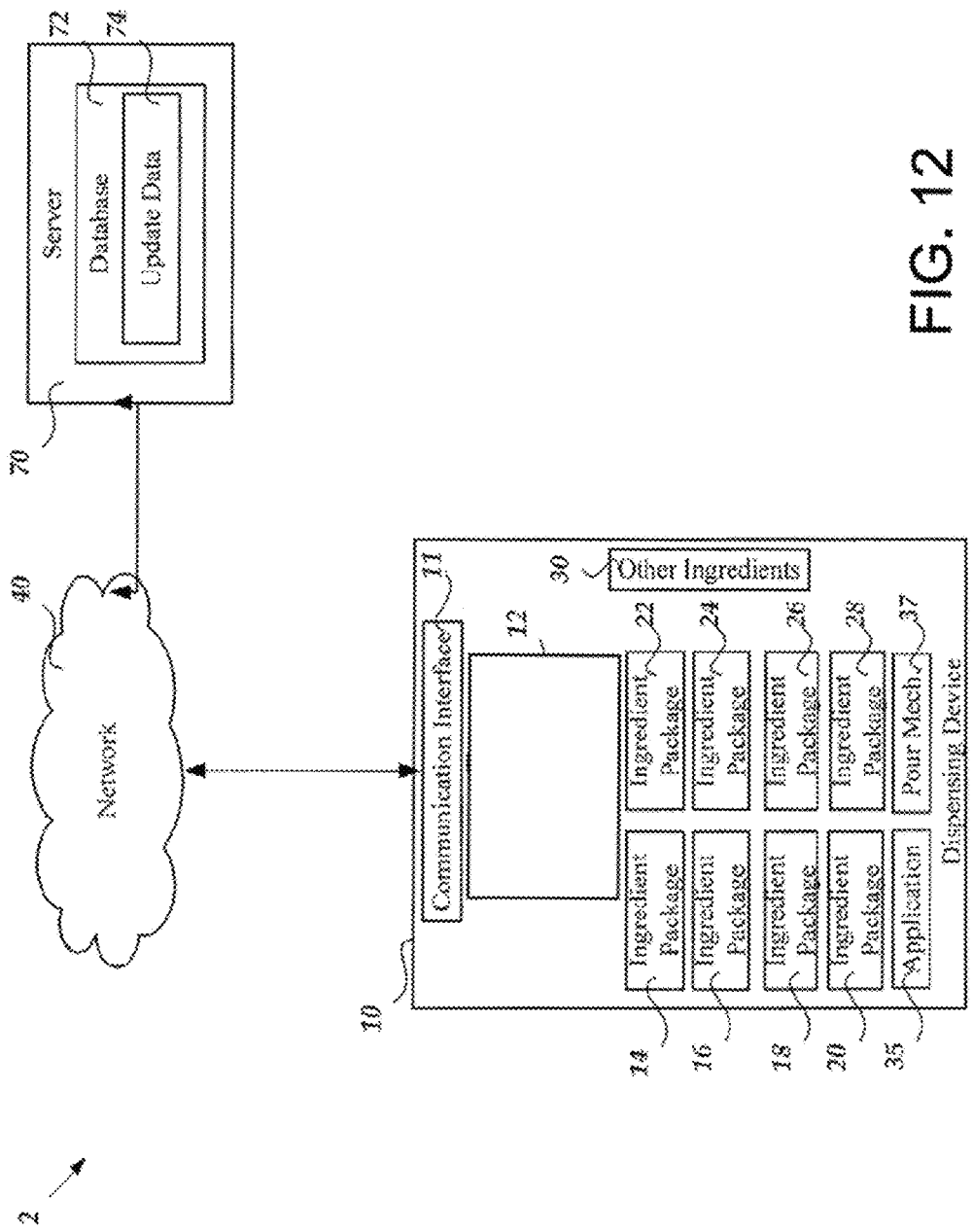
FIG. 12 is a schematic diagram of a dispensing device as may be described herein.

FIG. 12 is a schematic diagram illustrating an example system 2 for providing a dispenser control graphical user interface on a dispensing device 10. The dispensing device 10 may include a communication interface 11 and a control interface such as a selectable display screen 12.

The dispensing device 10 may also include ingredient packages (or pouches) 14, 16, 18, 20, 22, 24, 26 and 28. In some embodiments, the ingredient packages 14, 16, 18 and 20 may include various beverage bases or beverage base components such as beverage bases. In some embodiments, the ingredient packages 22, 24, 26, and 28 may include flavors (i.e., flavoring agents, flavor concentrates, or flavor syrups). In some embodiments, the beverage bases in the ingredient packages 14, 16, 18, and 20 may be concentrated syrups. In some embodiments, the beverage bases in the ingredient packages 14, 16, 18 and 20 may be replaced with or additionally provided with beverage base components. In some embodiments, each of the beverage bases or beverage base components in the ingredient packages and each of the flavors in the ingredient packages 22, 24, 26 and 28 may be separately stored or otherwise contained in individual removable cartridges that are stored in the dispensing device 10.

The aforementioned beverage components (i.e., beverage bases or beverage base components and flavors) may be combined, along with other beverage ingredients 30, to dispense various beverages or blended beverages (i.e., finished beverage products) from the dispensing device 10. The other beverage ingredients 30 may include diluents such as still, sparkling, or carbonated water, functional additives, or medicaments, for example. The other beverage ingredients 30 may be installed in the dispensing device 10, pumped to the dispensing device 10, or both.

The dispensing device 10 may also include a pour mechanism 37 for dispensing various beverages or blended beverages. The dispensing device 10 may further include a separate reservoir (not shown) for receiving ice and water for use in dispensing beverages. The dispensing device 10 further may include other types of product dispensers in accordance with some embodiments.

The dispensing device 10 may also be in communication with a server 70 over a network 40 that may include a local network or a wide area network (e.g., the Internet). In some embodiments, the communication between the dispensing device 10 and the server 70 may be accomplished utilizing any number of communication techniques including, but not limited to, BLUETOOTH wireless technology, Wi-Fi and other wireless or wireline communication standards or technologies, via the communication interface 11. The server 70 may include a database 72 that may store update data 74 associated with the dispensing device 10. In some embodiments, the update data 74 may comprise a software update for a specific application 35 on the dispensing device 10.

In some embodiments, the selectable display screen 12 may be actuated for selecting options associated with operating the dispensing device 10. The selected operations may include, but are not limited to, individually selecting and/or dispensing one or more products (e.g., beverage products), dispensing device initialization, product change out, product replacement and accessing a utilities menu (e.g., for dispensing device calibration, setting a clock/calendar, connecting to Wi-Fi, retrieving software updates, etc.).

Figure 13:
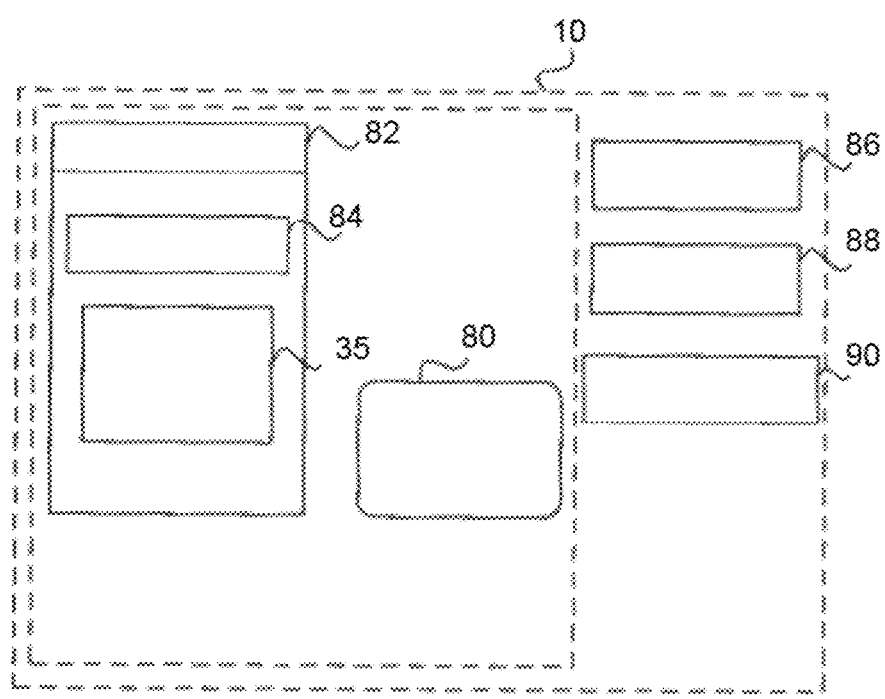
FIG. 13 is a further schematic diagram of the dispensing device of FIG. 12.

FIG. 13 is a block diagram of the dispensing device 10 showing at least one processing unit 80 and a system memory 82. The system memory 82 may include, but is not limited to, volatile (e.g. random access memory (RAM)), non-volatile (e.g. read-only memory (ROM)), flash memory, or any combination. System memory 82 may include an operating system 84 and the application 35. The operating system 84 may control operation of the dispensing device 10.

The dispensing device 10 may have additional features or functionality. For example, the dispensing device 10 may also include additional data storage devices (not shown) that may be removable and/or non-removable such as, for example, magnetic disks, optical disks, solid state storage devices ("SSD"), flash memory or tape. The dispensing device 10 may also have input device(s) 86 such as a keyboard, a mouse, a pen, a sound input device (e.g., a microphone), a touch input device, control knob input device, etc. Other examples of input devices include a gesture tracking system or an eye tracking system. Output device(s) 84 such as a touchscreen display, speakers, a printer, etc. may also be included. An example of such an output device is the display screen 12. The aforementioned devices are examples and others may be used. Communication connection(s) 90 may also be included and utilized to connect to the Internet (or other types of networks) as well as to remote computing systems.

Some embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

Computer readable media, as used herein, may include computer storage media. Computer storage media may include volatile and nonvolatile, removable and non-removable media implemented in any method or technology for storage of information (such as computer readable instructions, data structures, program modules, or other data) in hardware. The system memory 82 is an example of computer storage media (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium that can be used to store information and that can be accessed by the dispensing device 10. Any such computer storage media may also be part of the dispensing device 10. Computer storage media does not include a carrier wave or other propagated or modulated data signal.

Computer readable media, as used herein, may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. Communication media may include wired media such as a wired network or direct-wired connection, and wireless media such as acoustic, radio frequency (RF), infrared, and other wireless media.

One example of an application 35 for use with the dispensing device 10 is the selection of "hard" or "soft" ice. If "soft" ice is selected, the application 35 may provide instructions to increase, for example, the water content of the ice. Likewise, the ratios of beverage components to diluent also may be changed given the differing water content of the ice. Other types of dispensing parameters, such as the nature of the agitation, also may be changed. Other parameters also may be changed according to the nature of the ice or otherwise. The changes may be made at the dispensing device 10 and/or remotely.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An ice dispenser for dispensing a volume of ice, comprising:
    an ice bin configured to contain the volume of ice therein; and
    an ice deflector positioned within the ice bin, wherein the ice deflector comprises an open top defining an entrance of the ice deflector and an open bottom defining an exit of the ice deflector, and wherein the ice deflector comprises a reverse funnel configuration extending from the entrance of the ice deflector to the exit of the ice deflector such that the entrance of the ice deflector is narrower than the exit of the ice deflector to prevent the volume of ice from bridging therein in whole or in part.

2. The ice dispenser of claim 1, wherein the ice deflector comprises a pair of deflector side plates positioned in the reverse funnel configuration and extending from the entrance of the ice deflector to the exit of the ice deflector, and wherein a distance between the deflector side plates increases from the entrance of the ice deflector to the exit of the ice deflector.

3. The ice dispenser of claim 2, wherein the ice deflector further comprises a pair of top support plates extending from the deflector side plates away from the entrance of the ice deflector.

4. The ice dispenser of claim 2, wherein the ice deflector further comprises a pair of top support plates extending from the deflector side plates and defining an angle of less than 180° between the top support plates.

5. The ice dispenser of claim 1, wherein the reverse funnel configuration comprises an angle of about five degrees (5°) to about twenty degrees (20°) from a centerline of the ice deflector extending from the entrance of the ice deflector to the exit of the ice deflector.

6. The ice dispenser of claim 1, wherein the reverse funnel configuration comprises an angle of about a twelve degrees (12°) from a centerline of the ice deflector extending from the entrance of the ice deflector to the exit of the ice deflector.

7. The ice dispenser of claim 1, wherein the ice deflector comprises stainless steel.

8. The ice dispenser of claim 1, wherein the ice deflector comprises a passivated material.

9. The ice dispenser of claim 1, wherein the volume of ice comprises soft, pellet ice.

10. The ice dispenser of claim 1, further comprising an agitation system positioned within the ice bin below the ice deflector.

11. The ice dispenser of claim 10, wherein the agitation system comprises one or more agitator arms extending below the ice deflector and a drive motor configured to move the one or more agitator arms within the ice bin.

12. An ice dispenser, comprising:
    an ice bin;
    a volume of soft, pellet ice positioned within the ice bin; and
    an ice deflector positioned within the ice bin;
    wherein the ice deflector comprises an open top defining an entrance of the ice deflector, an open bottom defining an exit of the ice deflector, and a pair of deflector side plates positioned in a reverse funnel configuration extending from the entrance of the ice deflector to the exit of the ice deflector such that the entrance of the ice deflector is narrower than the exit of the ice deflector to prevent the volume of soft, pellet ice from bridging therein in whole or in part.

13. An ice dispenser for dispensing a volume of ice, comprising:
    an ice bin configured to contain the volume of ice therein;
    an agitator positioned within the ice bin; and
    an electro-mechanical ice deflector positioned about a top of the ice bin, wherein the electro-mechanical ice deflector comprises one or more ice deflecting arms positioned at least partially within the ice bin and above the agitator and a solenoid configured to translate the one or more ice deflecting arms in a linear direction within the ice bin.

14. The ice dispenser of claim 13, wherein the electro-mechanical ice deflector further comprises a support arm extending from the solenoid and attached to the one or more ice deflecting arms.

15. The ice dispenser of claim 14, wherein the solenoid is configured to move the support arm to translate the one or more ice deflecting arms in a horizontal direction relative to the ice bin.

16. The ice dispenser of claim 14, wherein the one or more ice deflecting arms comprises a plurality of ice deflecting arms attached to the support arm and spaced apart from one another.

17. The ice dispenser of claim 13, wherein the one or more ice deflecting arms comprises a pair of ice deflecting arms spaced apart from one another.

18. The ice dispenser of claim 17, wherein the solenoid is configured to translate the pair of ice deflecting arms in a vertical direction relative to the ice bin.

19. The ice dispenser of claim 17, wherein the pair of ice deflecting arms are angled relative to one another such that a distance between the pair of ice deflecting arms increases in a direction from the top of the ice bin toward a bottom of the ice bin.

20. The ice dispenser of claim 13, wherein the solenoid is positioned within the ice bin.

* * * * *